United States Patent [19]

Dornes et al.

[11] Patent Number: 5,060,360

[45] Date of Patent: Oct. 29, 1991

[54] CONNECTOR LOCATING APPARATUS

[75] Inventors: Bryan J. Dornes, Elizabethtown; Marlin R. Schollenberger, Myerstown; Joseph F. Stachura, Lebanon, all of Pa.

[73] Assignee: AMP Incorporated, Harrisburg, Pa.

[21] Appl. No.: 471,192

[22] Filed: Jan. 26, 1990

[51] Int. Cl.$^5$ .............................. B23P 19/04

[52] U.S. Cl. .............................. 29/281.5

[58] Field of Search .............. 269/43, 903; 29/271, 29/281.5, 759, 760, 559, 822, 464

[56] References Cited

U.S. PATENT DOCUMENTS

| | | | |
|---|---|---|---|
| 2,835,962 | 5/1958 | Talley et al. | 29/759 |
| 3,088,728 | 5/1963 | Sanborn | 269/903 |
| 4,079,497 | 3/1978 | Jernigan | 269/43 |

*Primary Examiner*—Robert C. Watson

*Attorney, Agent, or Firm*—James M. Trygg

[57] ABSTRACT

The present invention is an apparatus for and method of aligning the terminals of a group of connectors in side by side abutting relationship with tooling for terminating wires to the terminals thereof. The group of connectors is placed in a track with the first connector against a stop. A plurality of vertically reciprocal guide blades are arranged adjacent the track and are moved upwardly, one at a time, the first engaging the first connector and positioning it relative to the termination tooling followed by subsequent blades engaging the other connectors. These subsequent engagements occur one at a time in sequential order with increasing distance from the stop. When all connectors are positioned by engaging guide blades, wires are terminated to the connector terminals and the guide blades moved out of engagement so that the completed connector assembly can be removed and the process repeated.

7 Claims, 6 Drawing Sheets

CONNECTOR LOCATING APPARATUS

The present invention relates to automated electrical cable making machines and a method and apparatus for locating and accurately positioning a plurality of connectors to be assembled to the cable.

BACKGROUND OF THE INVENTION

Automated machines for making electrical cable assemblies are generally arranged to fabricate a given quantity of identical cable assemblies. During the fabrication, the conductors are cut to length and presented to a connector termination station for termination to a desired connector. Such a machine is depicted in FIG. 1 where there is shown an automated cable making machine 10 having a connector feeding apparatus 12, a wire terminating station 14, a quality check station 15, a connector marking station 16, a cable management and packaging station 18, a wire feed and measurement station 20, and a computerized control station 22 for controlling the operation of the machine 10. The machine 10 is designed to manufacture a desired quantity of kits of cable assemblies automatically and to physically arrange each kit in a separate package. The present invention relates to apparatus in the wire terminating station 14 which will be described in detail during the following discussion of the machine 10.

The general operation of the machine involves establishing an initial data base which is maintained by a computer 24, defining the various parameters of the cable assemblies to be made, the type and location of the various types of connectors to be used during fabrication, and other parameters defining various aspects of the specific configuration of the machine 10 and its operation. Very briefly, an operator will input into the computer 24, by means of a terminal 26, information identifying the cable assemblies to be made, the quantity of each that form a kit and the quantity of kits to be made. The computer then can manipulate the connector feeding apparatus 12 to select and deliver the desired type and quantity of connectors in the correct order for termination to the leading and trailing ends of the cable assemblies comprising each kit.

The feeding apparatus 12 is more clearly shown in U.S. patent application Ser. No. 423,479 filed Oct. 18, 1989 which is incorporated herein by reference and is assigned to the present assignee This feeding apparatus is arranged to feed a plurality of connectors, each of which may be different but having a common center to center terminal spacing, in end to end abutting relationship along a track to the terminating station 14. The spacing of the terminals of each individual connector is held to relatively close tolerances thereby permitting the use of mass termination tooling. However, when abutting several connectors end to end, if the tolerance allowances of the connector housings all go one way or the other, it will be impossible to align pre-spaced mass termination tooling with all of the terminals without repositioning the individual connectors.

The locating apparatus of the present invention addresses this problem by providing a novel way of locating and accurately positioning the individual connectors in alignment with the termination tooling.

SUMMARY OF THE INVENTION

The present invention is a method and apparatus for positioning a connector group consisting of a plurality of connectors on a desired spacing for termination of conductors to terminals associated with the connectors. The apparatus includes a track means for receiving and guiding the connectors in side by side abutting relationship. A stop means is provided for positioning one of the connectors in a known position along the track means. Alignment means is provided for engaging each of the connectors and positioning them on the desired spacing by engaging one of the connectors that is positioned closer to the stop means prior to engaging another connector that is positioned further away therefrom.

DESCRIPTION OF THE PREFERRED EMBODIMENT

Figure 1:
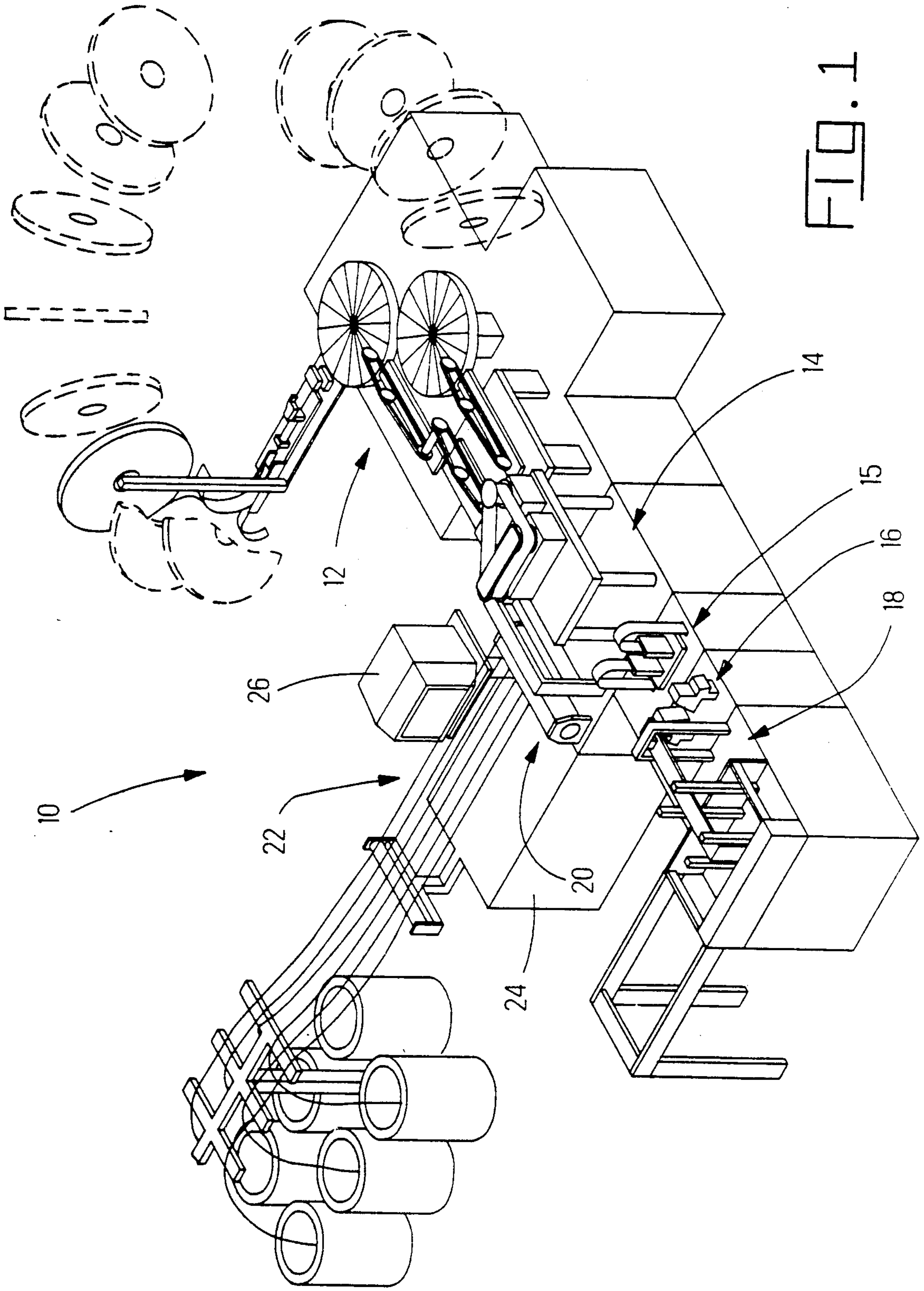
FIG. 1 is a schematic representation of an automated cable making machine of the type utilizing the teachings of the present invention.
Figures 2, 2A:
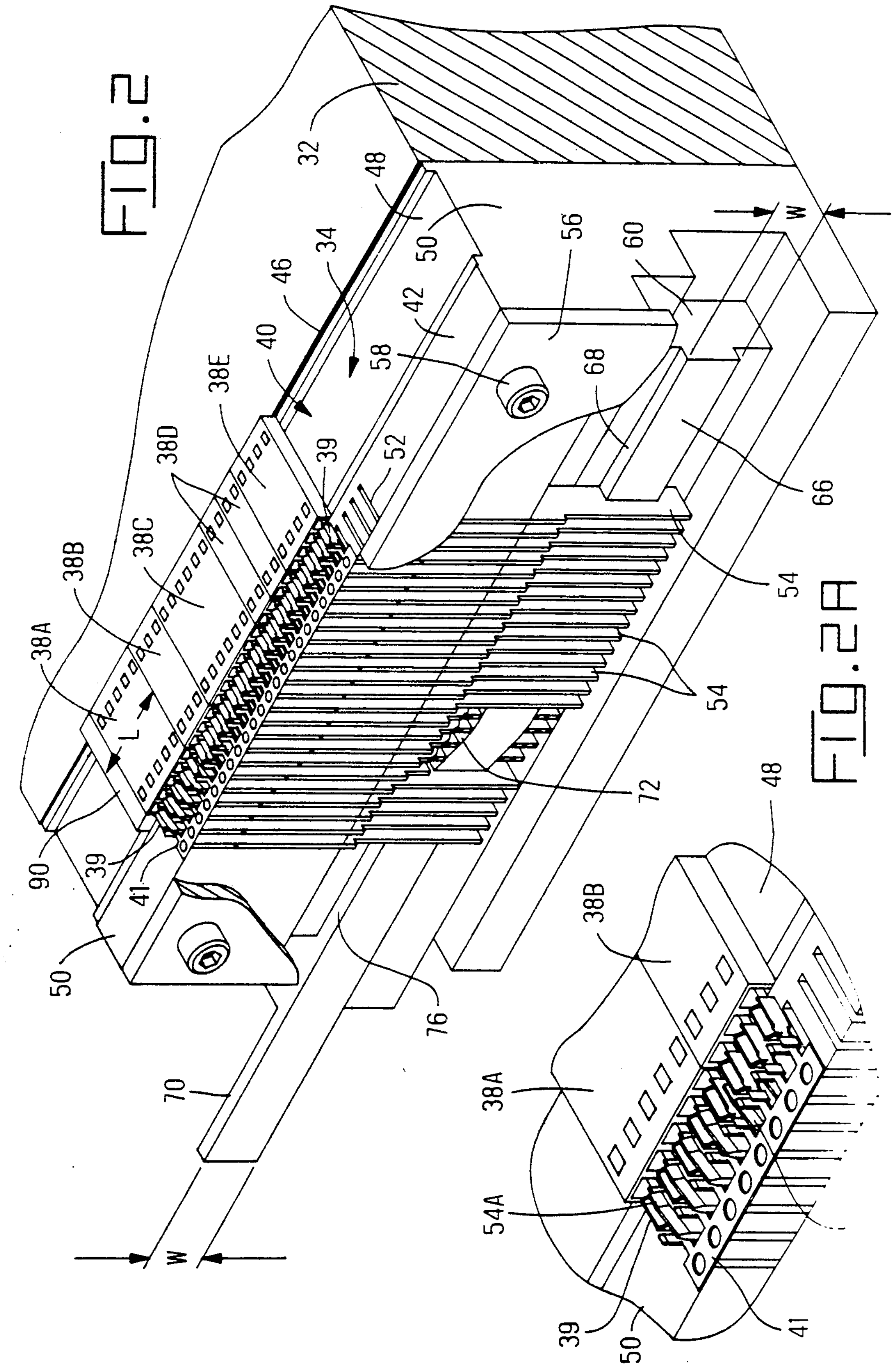
FIG. 2 is an isometric view showing the connector locating and positioning apparatus of the present invention.
FIG. 2A is an enlargement of a portion of the apparatus shown in FIG. 2.

There is shown in FIGS. 2 and 2A a connector locating and positioning apparatus 30 which is attached to the frame 32, only a portion of which is shown, of the automated cable making machine 10. The apparatus 30 includes a connector track 34 for guiding a group 36 of connectors 38A through 38E into the terminating station 14. The connector track 34 has a slot 40 formed in the surface 42 having side walls 44 and 46 spaced to closely guide the connectors 38 in the direction of the slot 40. An undercut 48 is formed in bottom surface of the slot 40 for clearance. A blade guide body 50 is attached to the frame 32 adjacent the connector track 34 and may be formed integral therewith as shown in FIG. 2. A series of vertical slots 52 are disposed in the blade guide body 50, each of which contains a guide blade 54. The blades and slots are dimensioned so that the blades 54 may undergo vertical reciprocating motion within the slots 52, as viewed in FIG. 2, without appreciable lateral play. A retaining plate 56 is attached to the blade guide body 50, with the screw fasteners 58, across the series of slots 52 thereby maintaining the guide blades 54 in their vertical alignment while permitting them to reciprocate upwardly and downwardly within the slots 52. As will be explained below, the guide body 50, blades 54, and retaining plate 56 together comprise an alignment means for engaging and positioning the connectors 38 within the track 34.

Figure 4:
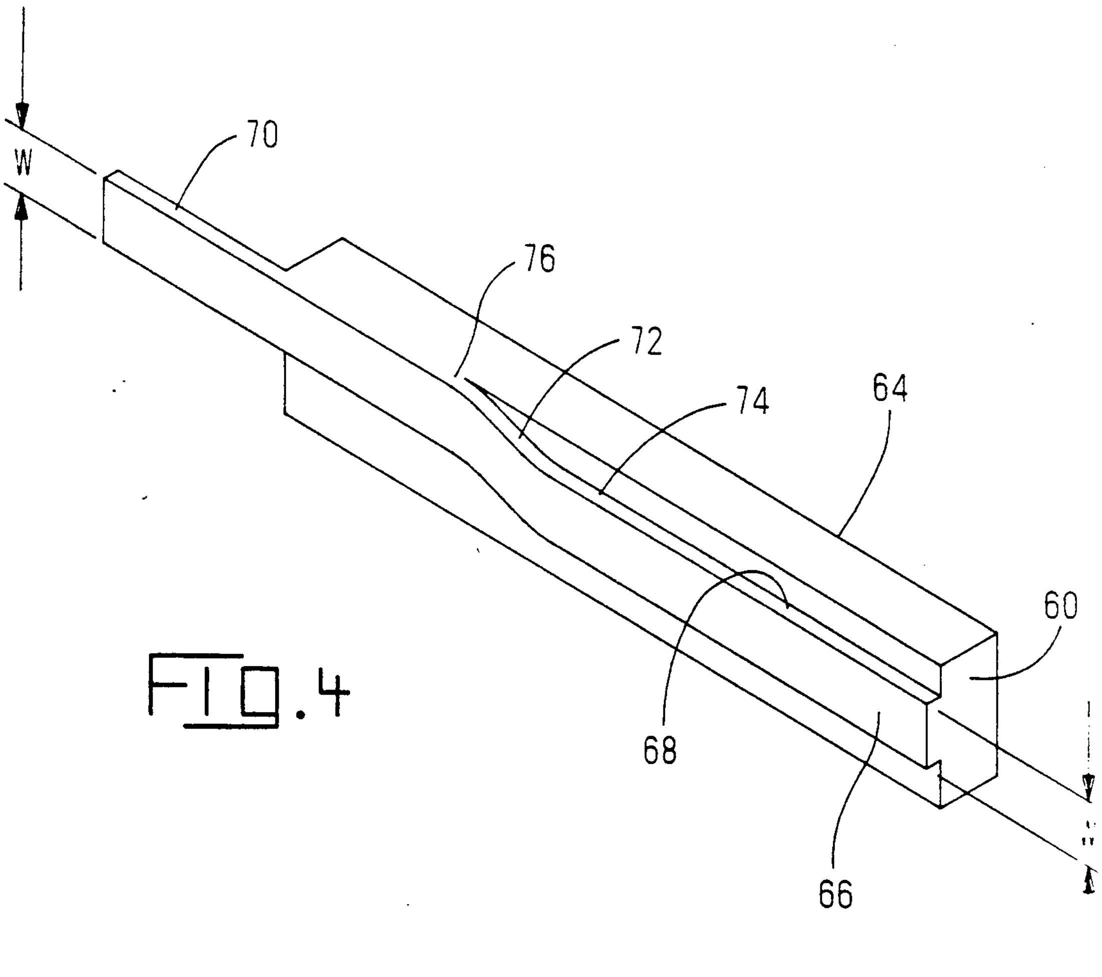
FIG. 4 is an isometric view showing the cam for causing the locating blades to engage or disengage the connectors as shown in FIG. 2.

The guide blades 54 are caused to reciprocate within their respective slots 52 by means of a slide 60 arranged to undergo left and right movement, as viewed in FIG. 2, transverse to the reciprocating movement of the blades 54. The movement of the slide 60 may be effected, for example, by an air cylinder under the control of the computer 24. As is shown in FIG. 4, the slide 60 includes a cam track 66 having a lower tracking surface 68, an upper tracking surface 70, and a ramp surface 72 that smoothly connects an end 74 of the lower surface 68 with an end 76 of the upper surface 70. The track 66 has a substantially constant width W with respect to the vertical for its entire length for a purpose will be explained below.

Figure 3:
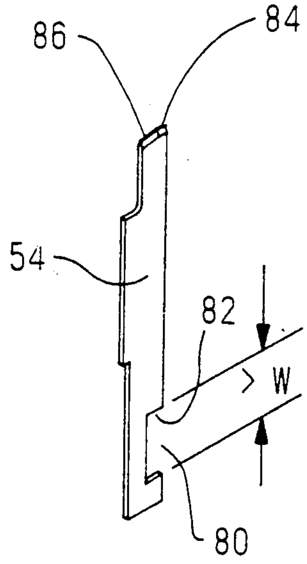
FIG. 3 is an isometric view showing one of the locating blades shown in FIG. 2.

FIG. 3 shows one of the guide blades 54 contained within the slot 52. As is shown, the guide blade 54 includes a notch 80 having a width slightly greater than the width W of the track 66. The notch 80 embraces the track 66, one edge 82 of which tracks the surfaces 68, 72, and 70 as the slide 60 is made to move from left to right, as viewed in FIG. 2, thereby causing the blade 54 to move upwardly in its slot 52. As the slide is made to move from right to left, the blade 54 is caused to move downwardly in its slot 52. The blade 54 includes a chamfered end 84 which is positioned adjacent the track 34 and a rake back portion 86 which diverges away from the chamfered end 84. This rake back portion 86 assures that only the chamfered end 84 will first engage the connector 38 as the blade 54 is moved upwardly by the track 66. This function will be more fully explained below.

Figure 5A:
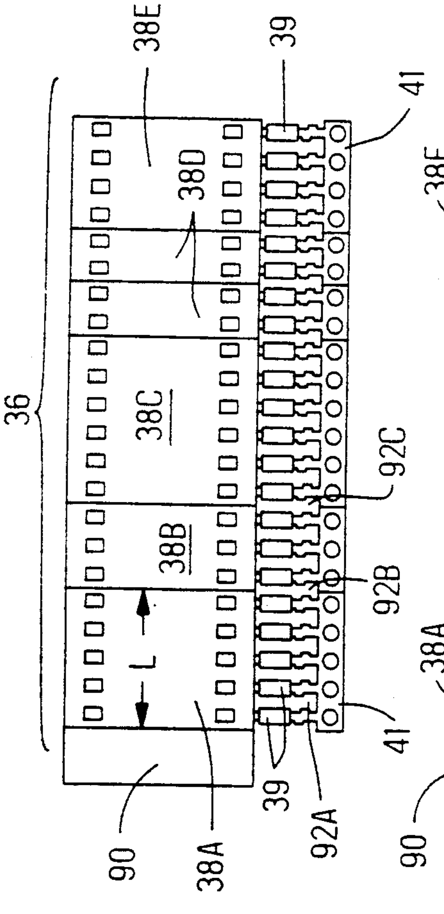
FIG. 5A is a plan view of the connectors shown in FIG. 5.

The group 36 of connectors shown in FIG. 2 comprises a connector 38A having five terminals 39, a connector 38B having three terminals 39, a connector 38C having 6 terminals 39, two connectors 38D having two terminals 39 each, and a connector 38E having four terminals 39. A carrier strip 41 interconnects the ends of the terminals 39 of each connector 38 in the usual manner and is removed after conductors are terminated to the terminals and the terminals fully inserted into the connector. The terminals 39 of each connector 38 are spaced on a desired spacing, such as 0.100 inch in the present example. The length L of each connector 39 is a multiple of this spacing, for example the connector 38A having four terminals 39 has a length of 0.400 inches. Additionally, each connector 38 has a manufacturing tolerance on its length L of minus 0.004 inch and plus 0.000 inch. Therefore, the overall length of the group 36 can vary by as much as 0.004 inch per connector or 0.024 in the present example. With all of the connectors 38 of the group 36 in abutting engagement as best seen in FIG. 5A, and assuming the maximum tolerance deviation on the negative side, it would be impossible to position the group 36 so that all of the terminals 39 are simultaneously in alignment with the wire termination tooling. By moving the connectors 38 out of abutting engagement, however, such alignment can be achieved.

Figure 5:
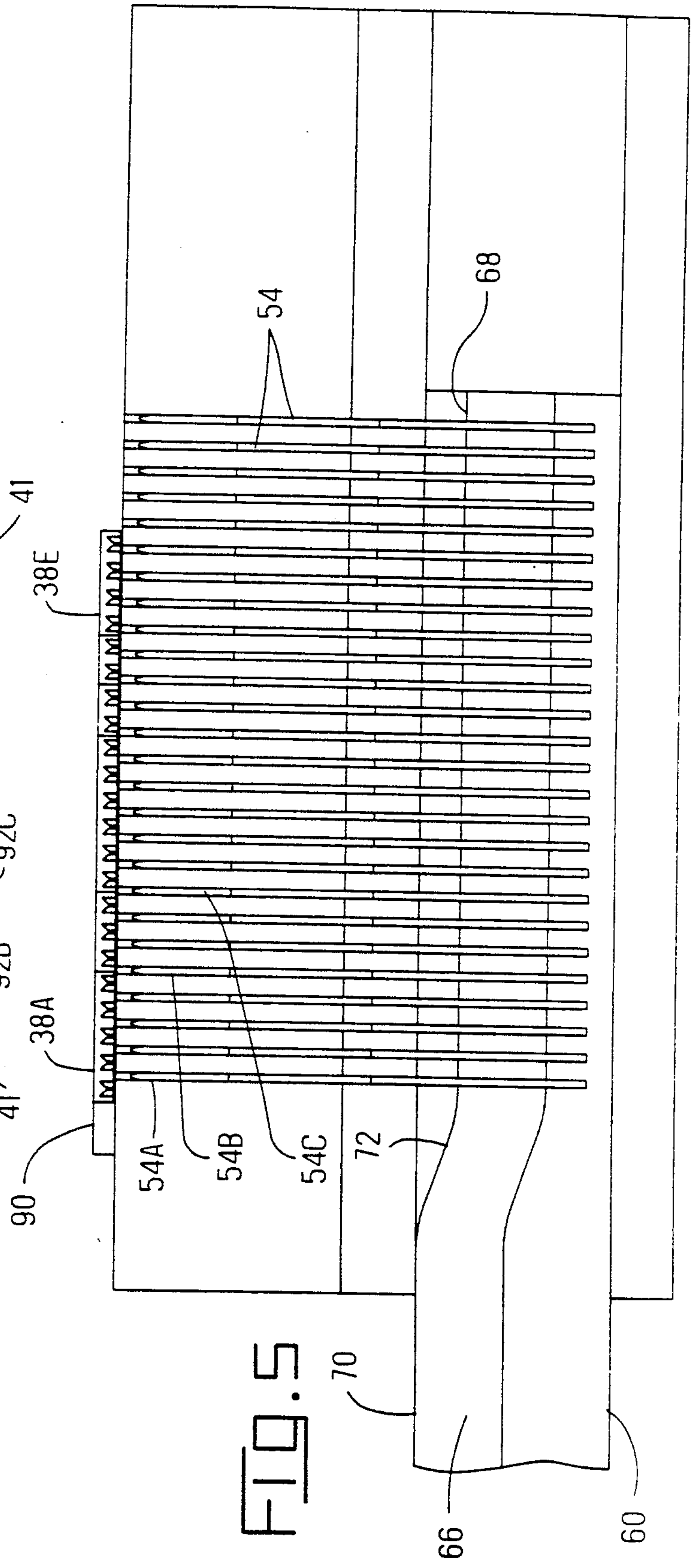
FIG. 5 is a front view of the apparatus shown in FIG. 2 prior to engagement with the connectors.
Figure 6A:
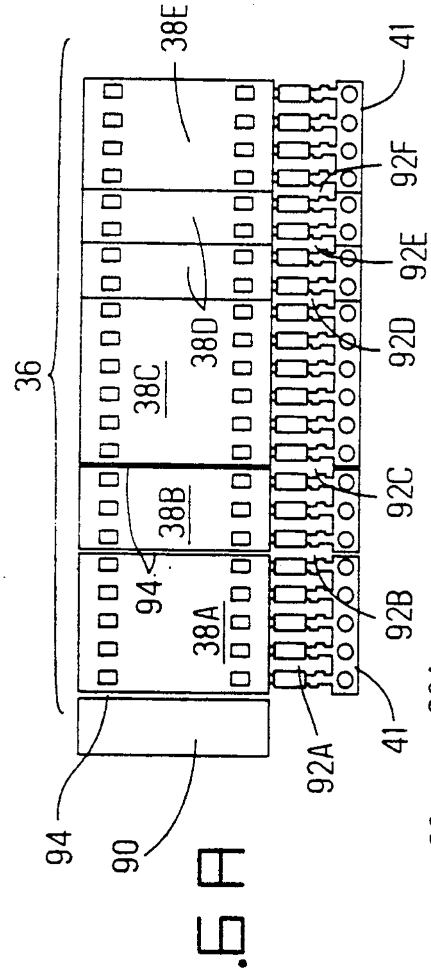
FIGS. 6 and 6A are views similar to those shown in FIGS. 5 and 5A showing partial engagement with the connectors.
Figure 6:
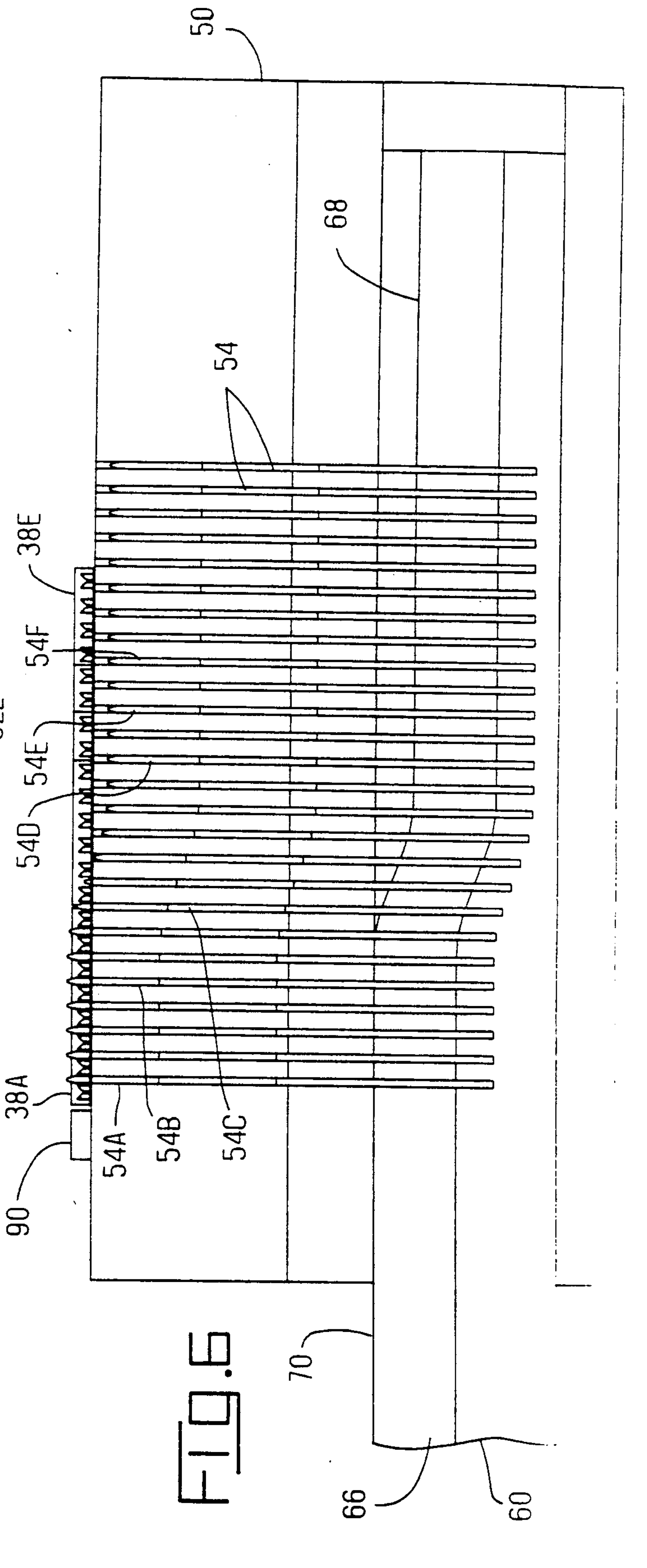

To accomplish this a stop 90 is positioned adjacent the connector track 34 as shown in FIGS. 2, 5, and 5A. The group 36 of connectors is then positioned in the connector track 34 with the connectors 38A through 38E in side by side abutting engagement, the connector 38A being against the stop 90 as best seen in FIG. 5A. FIG. 5 is a front view of the apparatus 30 while FIG. 5A is a top view of the connector group 36 and stop 90 as shown in FIG. 5. Therefore, FIGS. 5 and 5A are to be considered together as a pair, as are FIGS. 6 and 6A, and FIGS. 7 and 7A. The stop 90 is positioned so that the first guide blade 54A is in vertical alignment with the space 92A between the two left most terminals 39 of the connector 38A. Since the four spaces between the five terminals 39 of the connector 38A are on 0.100 inch centers, the corresponding first four guide blades beginning with 54A are in alignment therewith and will enter these spaces as the slide 60 is moved from left to right as viewed in FIGS. 5 and 6.

The spacing of the guide blades 54, as was stated above, is substantially 0.100 center to center, but the connectors 38A through 38E, in this example, are all slightly shorter than their nominal lengths that are multiples of 0.100 inch. Therefore the terminals 39 of each connector are slightly closer to the stop 90 than they otherwise would be. Therefore, as the first guide blade 54A enters the space 92A, its chamfered end 84 engages an edge of the second terminal 39, camming it and its connector 38A a slight amount to the right, as viewed in FIG. 5A. This necessarily moves the other connectors in the group 36 the same amount to the right. As the slide 60 continues moving toward the right, see FIGS. 6 and 6A, the guide blade 54B begins to enter the space 92B between the first and second connectors, 38A and 38B, the chamfered end 84 engaging and camming the first terminal 39 of the connector 38B slightly to the right, thereby moving the connectors 38C through 38E to the right the same amount. Continued movement of the slide 60 similarly causes the guide blade 54C to move upwardly into the space 92C thereby causing the connectors 38C through 38E to shift slightly to the right This process continues until all of the guide blades 54 have moved up the ramp surface 72 and are now in engagement with the upper surface 70 of the track 66, as seen in FIG. 7.

Figure 7A:
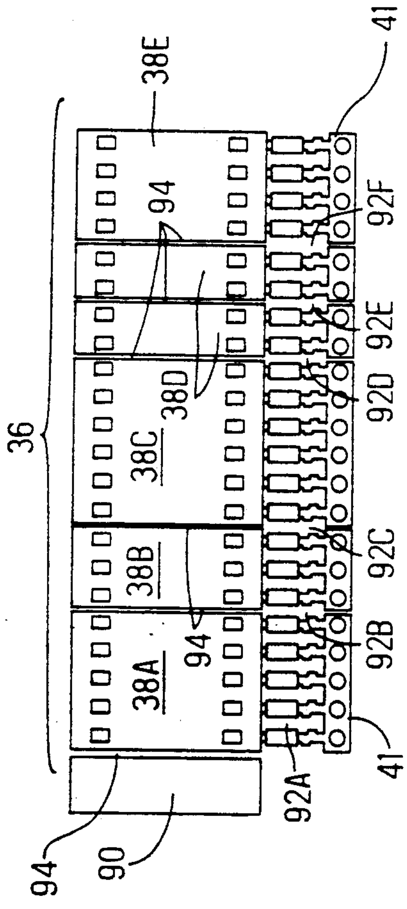
FIG. 7 and 7A are views similar to those shown in FIGS. 5 and 5A showing complete engagement with the connectors.
Figure 7:
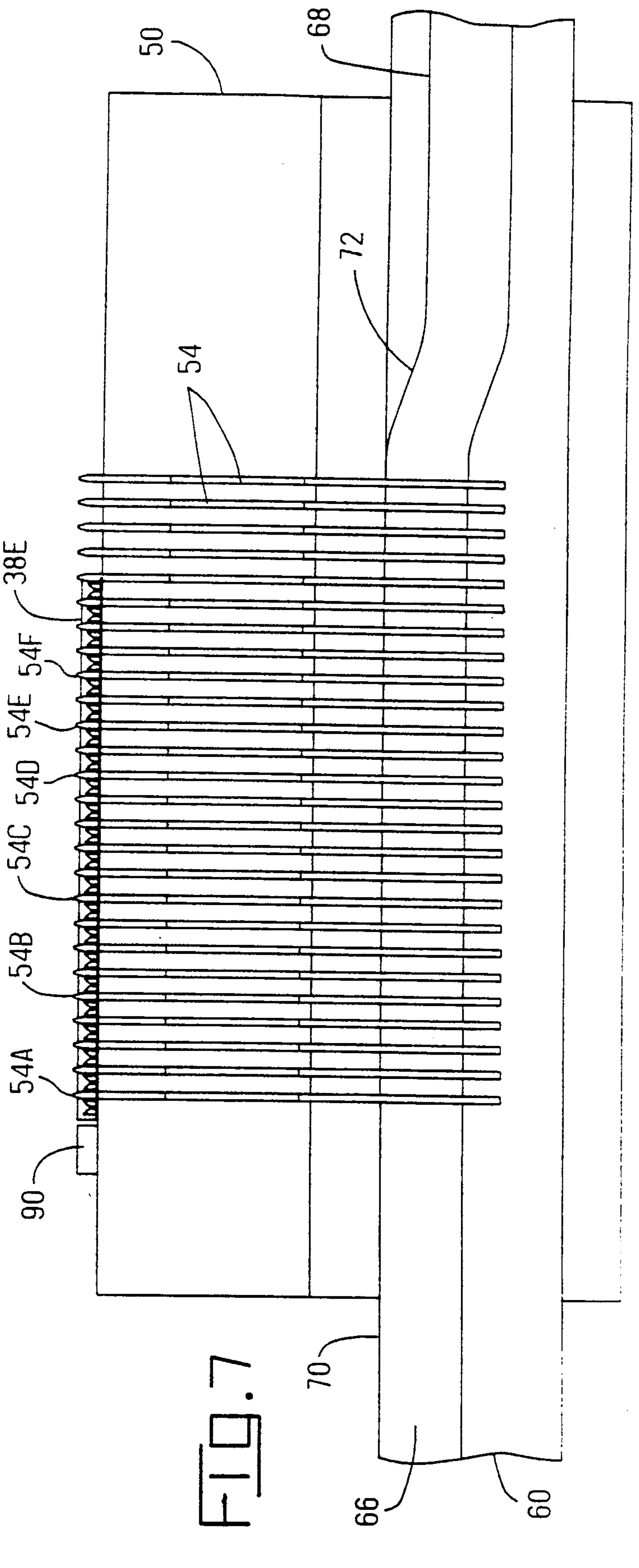

In the example just described where each connector 38 has a length L corresponding to the low end of the dimensional tolerance, slight gaps 94 will appear between the connectors as shown in FIG. 7A. Note that these gaps 94 are shown exaggerated in the figure and in reality are much smaller. In the case where each connector 38 has a length L corresponding to the high end of the dimensional tolerance, no gaps will appear because the spacing of the terminals 39 of all the connectors 38 relative to the stop 90 will be substantially identical to the spacing of the respective guide blades 54 relative to the stop 90. In actual operation, it is unlikely that either of these two extremes will occur. It is more likely that some of the connectors 38 will be manufactured toward the low end of the dimensional tolerance and some toward the high end. In any such case, the guide blades 54 are caused to move upwardly toward and into the spaces 92 between the terminals 39, starting with the guide blade and connector closest to the stop 90, and continuing rightwardly in seriatim as viewed in FIGS. 5 through 7, until all of the guide blades 54 have moved fully upwardly and all of the connectors 38 have moved into alignment on the desired spacing. Conductors, not shown, are then terminated to the terminals 39 in the usual manner at the wire terminating station 14 and the slide caused to move leftwardly, as viewed in FIG. 7, until all of the guide blades 54 are made to move downwardly by following the ramp surface 72 to the lower surface 68 of the track 66. At this point all of the blades 54 have disengaged from the connector group 36 which may be removed and the process repeated with a new group of connectors to be terminated.

An important advantage of the present invention is that connectors having a relatively wide dimensional tolerance an be automatically aligned with the tooling for terminating wires to the connector terminals. It will be appreciated by those skilled in the art that the alignment apparatus of the present invention lends itself to operating within a completely automated environment.

We claim:

1. In a cable making machine a connector locating apparatus for positioning a connector group consisting of a plurality of connectors on a desired spacing for termination of conductors to terminals associated with said connectors, said apparatus comprising:

(a) track means for receiving and guiding said plurality of connectors in side by side and abutting relationship, and arranged to permit concurrent movement of at least two abutting, adjacent said connectors along said track;

(b) stop means for positioning adjacent thereto only one of said plurality of side by side, abutting connectors in a known position along said track means;

(c) alignment means for engaging each of said plurality of connectors and positioning them on said desired spacing, said alignment means engaging one of said connectors that is positioned closer to said stop means prior to engaging another of said connectors that is positioned further away therefrom.

2. The apparatus according to claim 1 wherein said plurality of connectors includes a first connector at one end of said connector group and a last connector at the other end of said group and said one connector positioned adjacent said stop means being said first connector.

3. The apparatus according to claim 2 wherein said alignment means is arranged to engage and position each of said connectors in said group by engaging said first connector, followed by engaging said connectors intermediate said first and last connectors in seriatim, followed by engaging said last connector.

4. The apparatus according to claim 3 wherein some of said plurality of connectors include said terminals extending therefrom and said alignment means includes a plurality of relatively thin guide members which engage said connector by each guide member extending between adjacent terminals.

5. The apparatus according to claim 4 wherein each of said guide members includes a camming surface so that upon engagement with one of said connectors said camming surface will cause said one connector and adjacent connector to move laterally toward said other end of said group by an amount sufficient to align said one connector with said desired spacing.

6. The apparatus according to claim 5 wherein said alignment means includes a body adjacent said track means having said plurality of guide members arranged for reciprocating motion within said body so that said camming surfaces of said guide members are adjacent said track means and including means for imparting said reciprocating motion to effect said engaging of said connectors and to withdraw from said engagement.

7. The apparatus according to claim 6 wherein said means for imparting motion comprises a slide arranged for first and second movements transverse to said reciprocating movement of said guide members, said slide having a lower surface, an upper surface, and a ramp surface connecting an end of said lower surface with an end of said upper surface, and each of said plurality of guide members includes a follower in following engagement with said lower ramp, and upper surfaces so that as said slide undergoes said first movement said guide members undergo said reciprocating movement in a direction toward and into said engagement with said connectors and as said slide undergoes said second movement said guide members undergo said reciprocating movement in a direction away from said engagement.

* * * * *